US010679484B2

United States Patent
Amirthasamy et al.

(10) Patent No.: US 10,679,484 B2
(45) Date of Patent: Jun. 9, 2020

(54) METHODS AND APPARATUS FOR COMMUNICATING ALERT NOTIFICATIONS USING DISCRETE INPUT CHANNELS

(71) Applicant: Fisher Controls International LLC, Marshalltown, IA (US)

(72) Inventors: Stanley Felix Amirthasamy, Ames, IA (US); Jeffrey Dean Seyller, Colo, IA (US); Nicholas Edward Heath, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 46 days.

(21) Appl. No.: 15/879,112

(22) Filed: Jan. 24, 2018

(65) Prior Publication Data
US 2018/0218586 A1    Aug. 2, 2018

Related U.S. Application Data

(60) Provisional application No. 62/453,343, filed on Feb. 1, 2017.

(51) Int. Cl.
*G08B 21/18*    (2006.01)
*G05B 19/4063*    (2006.01)
(Continued)

(52) U.S. Cl.
CPC .......... *G08B 21/18* (2013.01); *G05B 19/0428* (2013.01); *G05B 19/058* (2013.01);
(Continued)

(58) Field of Classification Search
CPC .. G08B 21/18; G05B 19/0428; G05B 19/058; G05B 19/4063; G05B 23/027;
(Continued)

(56) References Cited

U.S. PATENT DOCUMENTS 5,682,476 A * 10/1997 Tapperson ......... G05B 19/4185
                                                       370/225
6,026,352 A *  2/2000 Burns ................ G05B 19/0425
                                                       702/182
(Continued)

FOREIGN PATENT DOCUMENTS

WO       0207732      10/2002
WO    2016016652       2/2016

OTHER PUBLICATIONS

Emerson Process Management, "Fisher FIELDVUE DVC6200 Digital Valve Controller", Instruction Manual, Dec. 2013, 148 pages.
(Continued)

*Primary Examiner* — Emily C Terrell
(74) *Attorney, Agent, or Firm* — Hanley, Flight & Zimmerman, LLC (57) ABSTRACT

Methods and apparatus for communicating alert notifications using discrete input channels are described. An apparatus includes a field device to control a process of a process plant. The field device has a digital valve controller including a process parameter monitor to monitor a process parameter of the field device and an alarm determiner to detect an error condition associated with the process parameter. The alarm determiner generates an alarm notification associated with the error condition of the process parameter. The digital valve controller includes an alarm status assignor to assign a status notification for equipment associated with the process parameter detected by the alarm determiner to be in the error condition and a discrete output channel. The apparatus includes a host device having a discrete input channel directly coupled to the discrete output channel to receive the alarm notification and the status notification from
(Continued)

the digital valve controller. The host device is to be communicatively coupled to a control room of a process plant.

22 Claims, 6 Drawing Sheets

(51) Int. Cl.
*G05B 23/02* (2006.01)
*G05B 19/042* (2006.01)
*G05B 19/05* (2006.01)

(52) U.S. Cl.
CPC ....... *G05B 19/4063* (2013.01); *G05B 23/027* (2013.01); *G05B 23/0216* (2013.01); *G05B 2219/25428* (2013.01); *G05B 2219/31211* (2013.01); *G05B 2219/33331* (2013.01); *G05B 2219/35272* (2013.01)

(58) Field of Classification Search
CPC ...... G05B 23/0216; G05B 2219/25428; G05B 2219/31211; G05B 2219/33331; G05B 2219/35272
USPC .......................................................... 340/500
See application file for complete search history.

(56) References Cited

U.S. PATENT DOCUMENTS

| | | | | |
|---|---|---|---|---|
| 6,044,305 A * | 3/2000 | Larson | ............... | G05B 19/4184 700/11 |
| 7,516,043 B2 * | 4/2009 | Junk | ................. | G05B 19/0428 701/31.4 |
| 8,838,413 B2 * | 9/2014 | Genta | .................... | G05B 23/00 702/179 |
| 2002/0147511 A1 * | 10/2002 | Eryurek | ............... | G05B 23/027 700/80 |
| 2003/0153988 A1 * | 8/2003 | Shepard | ............... | G05B 19/042 700/19 |
| 2007/0250246 A1 | 10/2007 | Balasu | | |
| 2012/0101600 A1 | 4/2012 | Schrier et al. | | |
| 2015/0112640 A1 | 4/2015 | Niro et al. | | |

OTHER PUBLICATIONS

Emerson Process Management, "Fisher FIELDVUE DVC6200 Series Digital Valve Controllers", Quick Start Guide, Dec. 2016, 76 pages.

Emerson Process Management, "Fisher FIELDVUE DVC6200f Digital Valve Controller for Foundation fieldbus", Instruction Manual, May 2016, 314 pages.

Emerson Process Management, "Fisher FIELDVUE DVC6200 Digital Valve Controller", Instruction Manual, Mar. 2016, 104 pages.

Emerson Process Management, "Fieldbus communications", 2002, 8 pages.

International Searching Authority, "International Search Report," issued in connection with International Patent Application No. PCT/US2018/016061, dated May 15, 2018, 6 pages.

International Searching Authority, "Written Opinion," issued in connection with International Patent Application No. PCT/US2018/016061, dated May 15, 2018, 6 pages.

* cited by examiner

METHODS AND APPARATUS FOR COMMUNICATING ALERT NOTIFICATIONS USING DISCRETE INPUT CHANNELS

RELATED APPLICATION

This patent application claims the benefit of U.S. Provisional Application Ser. No. 62/453,343, filed on Feb. 1, 2017. U.S. Provisional Application Ser. No. 62/453,343 is hereby incorporated herein by reference in its entirety.

FIELD OF THE DISCLOSURE

This disclosure relates generally to process control systems and, more particularly, to methods and apparatus for communicating alert notifications using discrete input channels.

BACKGROUND

Process control systems, like those used in chemical, petroleum or other processes, typically include one or more process controllers communicatively coupled to one or more field devices via analog, digital or combined analog/digital buses. The field devices, which may be, for example, device controllers, valves, valve actuators, valve positioners, switches, transmitters, sensors, (e.g., temperature sensors, pressure sensors, flow rate sensors, and chemical composition sensors) perform process control functions within the process such as opening or closing valves and/or measuring or determining process control parameter(s). The process controllers receive signals indicative of process measurements made by the field devices and then process this information to generate control signals to implement control routines, to make other process control decisions, and to initiate process control system alarms.

SUMMARY

An example apparatus includes a field device to control a process of a process plant. The field device has a digital valve controller including a process parameter monitor to monitor a process parameter of the field device and an alarm determiner to detect an error condition associated with the process parameter. The alarm determiner generates an alarm notification associated with the error condition of the process parameter. The digital valve controller includes an alarm status assignor to assign a status notification for equipment associated with the process parameter detected by the alarm determiner to be in the error condition and a discrete output channel. The apparatus includes a host device having a discrete input channel directly coupled to the discrete output channel to receive the alarm notification and the status notification from the digital valve controller. The host device is to be communicatively coupled to a control room of a process plant.

An example method includes detecting an error condition associated with a field device of a process control system; monitoring a status of equipment associated with the error condition; assigning a status notification based on an operational status of the monitored equipment; and communicating the detected error condition and the status notification to a discrete input channel of a host.

An example machine readable instruction, when executed, cause a machine to: detect an error condition associated with a field device of a process control system; monitor a status of equipment associated with the error condition; assign a status notification based on an operational status of the monitored equipment; and communicate the detected error condition and the status notification to a discrete input channel of a host.

DETAILED DESCRIPTION

Information from field devices and/or controllers is usually made available over a data highway or communication network to one or more other host or hardware devices such as, for example, operator workstations, personal computers, data historians, report generators, centralized databases, etc. Such devices are typically located in control rooms and/or other locations remotely situated relative to the harsher plant environment. These hardware devices, for example, run applications that enable an operator to perform any of a variety of functions with respect to the process of a process control system, such as viewing the current state of the process, changing an operating state, changing settings of a process control routine, modifying the operation of the process controllers and/or the field devices, viewing alarms generated by field devices and/or process controllers, simulating the operation of the process for the purpose of training personnel and/or evaluating the process, etc.

Typically, field devices are communicatively coupled to hardware devices or a host via a publisher-subscriber network (e.g., a token-passing protocol, a master/slave protocol). In some such examples, the field device controller publishes information and the host subscriber receives the published information from the field device controller. In some such example protocols, each field device is allotted a scheduled and/or fixed amount of time to communicate with the host so that communication from multiple other field devices and/or nodes associated with the network cannot collide or interrupt each other. In some such examples, each field device and/or node in a network has a scheduled time to communicate with the host. Thus, for example, when a process parameter and/or field device parameter triggers an alert, the field device stores the alert status in a local memory of the field device (e.g., a digital valve controller of a field device) until the field device is scheduled to communicate with the host. In turn, the field device communicates the alert status to the host when the field device is provided a token (i.e., scheduled) to communicate the with the host. In some instances, if the allotted time slot or period provided to the field device is insufficient to transmit the process data and the alert status data, all non-communicated information is stored in the local memory of the field device (e.g., a field device digital valve controller) until sufficient time to convey the alert status information to the host exists during a next scheduled communication. Thus, in some instances, a host may not receive an alert notification of a field device in a network of field devices until after a significant amount of time has passed. Thus, an alert notification to be communicated by a field device over a network using a publisher/subscriber protocol may be delayed.

The example methods and apparatus disclosed herein provide direct communication between a field device controller and a host controller such as, for example, a hardware device (e.g., operator station, a controller, etc.). Such a configuration enables the field device controller to communicate an alert notification to the host upon occurrence of a detected error associated with the alert notification. To provide a host with an alert notification, the example methods and apparatus disclosed herein assign a configurable alert of a field device controller and communicate the configurable alert to a host via a discrete input channel of the host (e.g., a hardware device, operation station, etc.). For example, an alert to be communicated by a field device controller disclosed herein may be assigned to a specific or dedicated discrete output channel of the field device controller that is directly coupled (e.g., via a wired communication) to a discrete input channel of the host. Such communication between the field device and the host via the discrete output channel of the field device and the discrete input channel of the host enables unsolicited communication between the field device and the host. For example, a host may sample for alert notifications via the discrete input channel every millisecond (e.g. or any other duration).

Additionally, the example methods and apparatus disclosed herein enhance reliability of an alert notification by providing a status. For example, the example methods and apparatus disclosed herein provides a status associated with every parameter to ensure data reliability. For example, a status may be a "good" status or a bad" status. For example, a bad status signal may indicate a device failure such as, for example, a failed sensor (e.g., a position sensor, a sensor on a temperature transmitter, etc.). The status may be provided to the host via a discrete input channel. For example, the methods and apparatus disclosed herein transmit an alert notification and a status notification to a host via the discrete input channel of the host. In some examples, the host may include a function block to receive the transmitted information (e.g., the alert notification and the status notification) and/or to process the transmitted information. To communicate the alert notification and the status notification to the host via the discrete input channel of the host, the example methods and apparatus disclosed herein employ a communication protocol such as, for example, Fieldbus protocol that converts the alert notification and the status notification into packets (e.g., 2 bits) that are communicated to the host via the discrete input channel. The host may receive the packets (e.g., via a function block) and interpret the information to detect or determine the alert notification and the status notification. The host may then communicate the information to an operator station and/or may command an operation of the field device based on the alert notification and the status notification.

Figure 1:
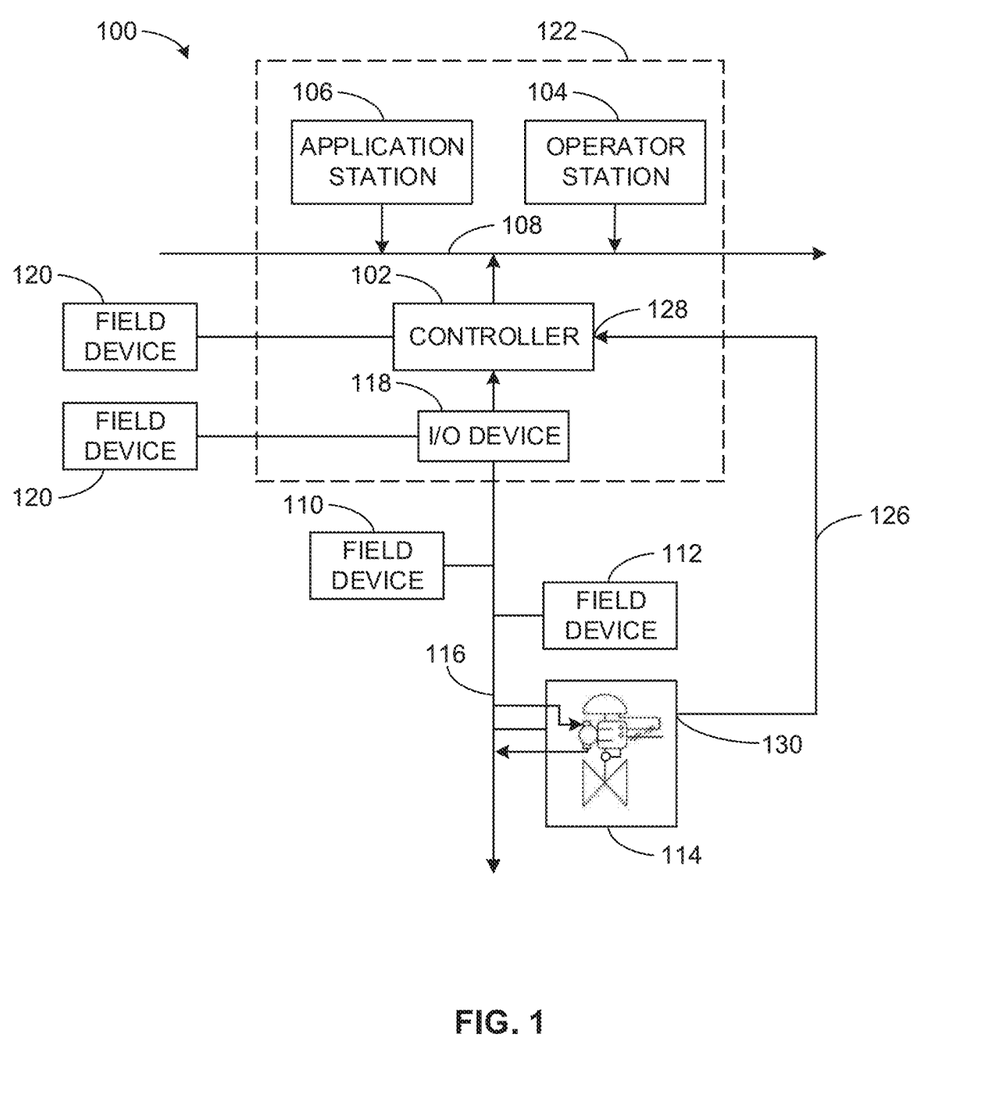
FIG. 1 is a schematic illustration of an example process control system implemented with the example methods and apparatus in accordance with the teachings of this disclosure.

FIG. 1 is a schematic illustration of an example process control system 100 implemented with the example methods and apparatus disclosed herein. The example process control system 100 of FIG. 1 includes one or more process controllers (one of which is designated at reference numeral 102), one or more operator stations (one of which is designated at reference numeral 104), and one or more workstations (one of which is designated at reference numeral 106). The controller 102 of the illustrated example is communicatively coupled to the operator station 104 and/or the application station 106. For example, the example controller 102, the example operator station 104 and the example workstation 104 of the illustrated example are communicatively coupled via a bus and/or local area network (LAN) 108, which is commonly referred to as an application control network (ACN).

The example operator station 104 of FIG. 1 allows an operator to review and/or operate one or more operator display screens and/or applications that enable the operator to view process control system variables, view process control system states, view process control system conditions, view process control system alarms, and/or change process control system settings (e.g., set points, operating states, clear alarms, silence alarms, etc.).

The example application station 106 of FIG. 1 may be configured as an application station to perform one or more information technology applications, user-interactive applications and/or communication applications. For example, the application station 106 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example application station 106 of FIG. 1 may be implemented using one or more workstations and/or any other suitable computer systems and/or processing systems. For example, the operator station 104 and/or the application station 106 could be implemented using single processor personal computers, single or multi-processor workstations, etc.

The example LAN 108 of FIG. 1 may be implemented using any desired communication medium and protocol. For example, the example LAN 108 may be based on a hardwired and/or wireless Ethernet communication scheme. However, as will be readily appreciated by those having ordinary skill in the art, any other suitable communication medium(s) and/or protocol(s) could be used. Further, although a single LAN 108 is illustrated in FIG. 1, more than one LAN and/or other alternative pieces of communication hardware may be used to provide redundant communication paths between the example systems of FIG. 1.

The example controller 102 of FIG. 1 is coupled to a plurality of smart field devices 110, 112 and 114 via a digital data bus 116 and the input/output (I/O) gateway 118. The smart field devices 110, 112, and 114 may be valves, actuators, sensors, and/or other types of equipment including, for example, Fieldbus devices, standard 4-20 ma devices, HART devices, wireless HART devices, Profibus devices, etc. and may communicate with the controller 102 via the digital data bus 116 using any known or desired communication protocol such as the Fieldbus protocol, the HART protocol, a wireless HART protocol or other wireless protocol, the 4-20 ma analog protocol, etc. Generally, devices that are located within the process environment and that perform a function directly impacting the control of the process (e.g., a physical function such as opening or closing valves, a measurement function to be used in a control algorithm or loop, and/or other function) are referred to herein as "field devices."

Additional I/O devices (similar and/or identical to the I/O device 118 may be coupled to the controller 102 to enable additional groups of smart field devices, which may be Foundation Fieldbus devices, HART devices, etc.), to communicate with the controller 102. In addition to the example smart field devices 110, 112, and 114, one or more non-smart field devices 120 and may be communicatively coupled to the example controller 102 and/or the I/O device 118. The example non-smart field devices and of FIG. 1 may be, for example, conventional 4-20 milliamp (mA) or 0-10 volts direct current (VDC) devices that communicate with the controller 102 and/or the I/O device 118 via respective hardwired links.

The example controller 102 of FIG. 1 may be, for example, a DeltaV™ controller sold by Fisher-Rosemount Systems, Inc., an Emerson Process Management company. While only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other system operator using the operator station 104 and which have been downloaded to and/or instantiated in the controller 102. For example, the controller 102 can communicate with control elements, such as the field devices 110, 112, 114 and function blocks within field devices (e.g., the field devices 110, 112, 114) distributed throughout a process plant to perform one or more process control routines to thereby implement desired control of the field devices of the process plant or of one or more processes operating in the process plant. Additionally, the controller 102 of the illustrated example may include one or more function blocks to process information or inputs (e.g., parameter inputs, alert notifications, status notifications, etc.) that are provided by the field devices 110, 112, 114.

The example field devices 110, 112, and 114 includes input devices capable of receiving inputs to control a process via, for example, valves, pumps, fans, heaters, coolers, and/or other devices. The example process control system 100 also includes output devices capable of generating outputs such as, for example, thermometers, pressure gauges, flow meters, and/or other devices. The input devices and output devices are communicatively coupled to the controller 102 (e.g., a DeltaV™ controller), which collects information output by the output devices and transmits instructions to the input devices to cause changes to the process.

The information collected by the controller 102 includes, for example, process information, environmental information, and values of process variables (e.g., measured process variables such as, for example, reactor inlet pressure). Some example process control environments include a plurality of controllers. The controller 102 generates notifications based on the information output to the controller 102. Example notifications include information regarding process control variables such as, for example, names of process control variables, current values and/or states of the process control variables, past values and/or states of the process control variables, graphical trend information, location of the process control variables in the process control system 100, event history (i.e., prior operator actions), and/or other information. Some example notifications include, for example, alarm information, alert information, and/or prompt information. In such examples, the example notifications include, for example, probable causes, recommended actions, and consequences of inaction. In some examples, the notifications are categorized and/or labeled. For example, notifications requiring immediate operator response may be categorized and/or labeled as alarms. In some examples, the labels are indicated visually (e.g., a red outline, blinking, text, etc.).

As noted above, communication between the field devices 110, 112, 114 may be provided to the controller 102 (e.g., a host 122) based on a master schedule (e.g., a cyclic or deterministic communication). For example, communication between the field devices 110 and 112 and the controller 102 (i.e., the host 122) may occur during scheduled times (e.g., every half-hour, every hour). Such scheduled communications use a publisher/subscriber method. For example, data is sent or published over the digital bus 116 and all controllers on the network that subscribed to receive that data from the devices receive the data on a predetermined schedule. Thus, each of the field devices 110, 112, and 114 is provided with a (e.g., a predetermined) scheduled time period in which to communicate information (e.g., alerts, error conditions, etc.) to the controller 102. In some instances, due to time restrictions imposed by having predetermined or scheduled communications, a field device may not be able to communicate all data or information (e.g., stored in buffer) to the controller 102 during the predetermined scheduled time. Thus, the controller 102 (i.e., the host 122) may not receive information from the field devices 110, 112, and 114 in real time.

In some examples, the communication may be provided via a token-based protocol via the digital data bus 116. The token-based communication may enable unscheduled (e.g., acyclic) communication to allow for alarm information to be communicated to the controller 102 outside of the predetermined scheduled time for a particular field device. The token-based protocol enables only one of the field devices 110, 112, and 114 to communicate with the controller 102 at a given time. Thus, alert or warning signals generated by the field device 110 and/or the field device 112 may be communicated to the controller 102 when a communication channel between the controller 102 and the field device 110 is open or allowed by the token-based protocol. However, token-based communications have limited allotted time during which the device can communicate with the controller 102 (e.g., a host). Thus, a token-based protocol may limit the amount of information that can be transmitted during the allotted time. If the allotted time expires before the device finishes communication of its messages, a field device may not be able to communicate all data or information (e.g., stored in buffer) to the controller 102. As a result, in these examples, the field device must then wait for the predetermined schedule time and/or another token-based opportunity to forward the remaining messages as information to the controller 102. Thus, the controller 102 (i.e., the host 122) may not receive information from the field devices 110, 112, and 114 in real time.

To allow process control system operators to visually perceive the temporal relationships of the alarms, as well as state changes and/or manual control actions of the smart field devices 110 and 112 due to delays in transmission of information from the field devices 110, 112 to the controller 102, the example operator station 104 includes and/or implements an alarm presentation interface to graphically display all active alarms in a timeline.

Unlike the smart field device 110 and/or the smart field device 112 of the illustrated example, the smart field device 114 communicates with the controller 102, the operating station 104 and/or the application station 106 on a substantially continuous manner or in real time (e.g., every millisecond) as opposed to a scheduled time provided by the publisher/subscriber protocol or a token-based protocol. To enable communication between the smart field device 114 and the controller 102 in real time, the example smart field device 114 of the illustrated example is (e.g., directly) communicatively coupled to the controller 102. For example, a discrete input channel 128 of the controller 102 of the illustrated example is directly coupled (e.g., wired) to a discrete output channel 130 of the smart field device 114 via a discrete or dedicated communication interface 126 (e.g., a wired or wireless communication link). Such communication interface 126 enables the smart field device 114 to communicate with the controller 102 every microsecond and is not dependent on a scheduled time frame such as provided by token-based systems. The controller 102 may include a function block to process the information provided by the smart field device 114. Thus, process data, alert notifications and/or status notifications may be received by the controller 102, the operator station 104 and/or the application station 106 as the smart field device 114 identifies such alerts. The communication between the smart field device 114 and the controller 102 provides an on-demand communication system.

In the illustrated example, the controller 102 functions as the host 122. In other words, the smart field device 114 of the illustrated example is (e.g., directly) coupled to the discrete input channel 128 of a host such as, for example, the controller 102. However, in some examples, the operator station 104, the application station 106 and/or the I/O device 118 may function as the host 122. In some such examples, the smart fluid device 114 can be directly coupled to discrete inputs of the respective operation station 104, the application station 106 and/or the I/O device 118.

While FIG. 1 illustrates an example process control system 100 within which the methods and apparatus to control information presented to process control system operators described in greater detail below may be advantageously employed, persons of ordinary skill in the art will readily appreciate that the methods and apparatus to control information presented to operators described herein may, if desired, be advantageously employed in other process plants and/or process control systems of greater or less complexity (e.g., having more than one controller, across more than one geographic location, etc.) than the illustrated example of FIG. 1.

Figure 2:
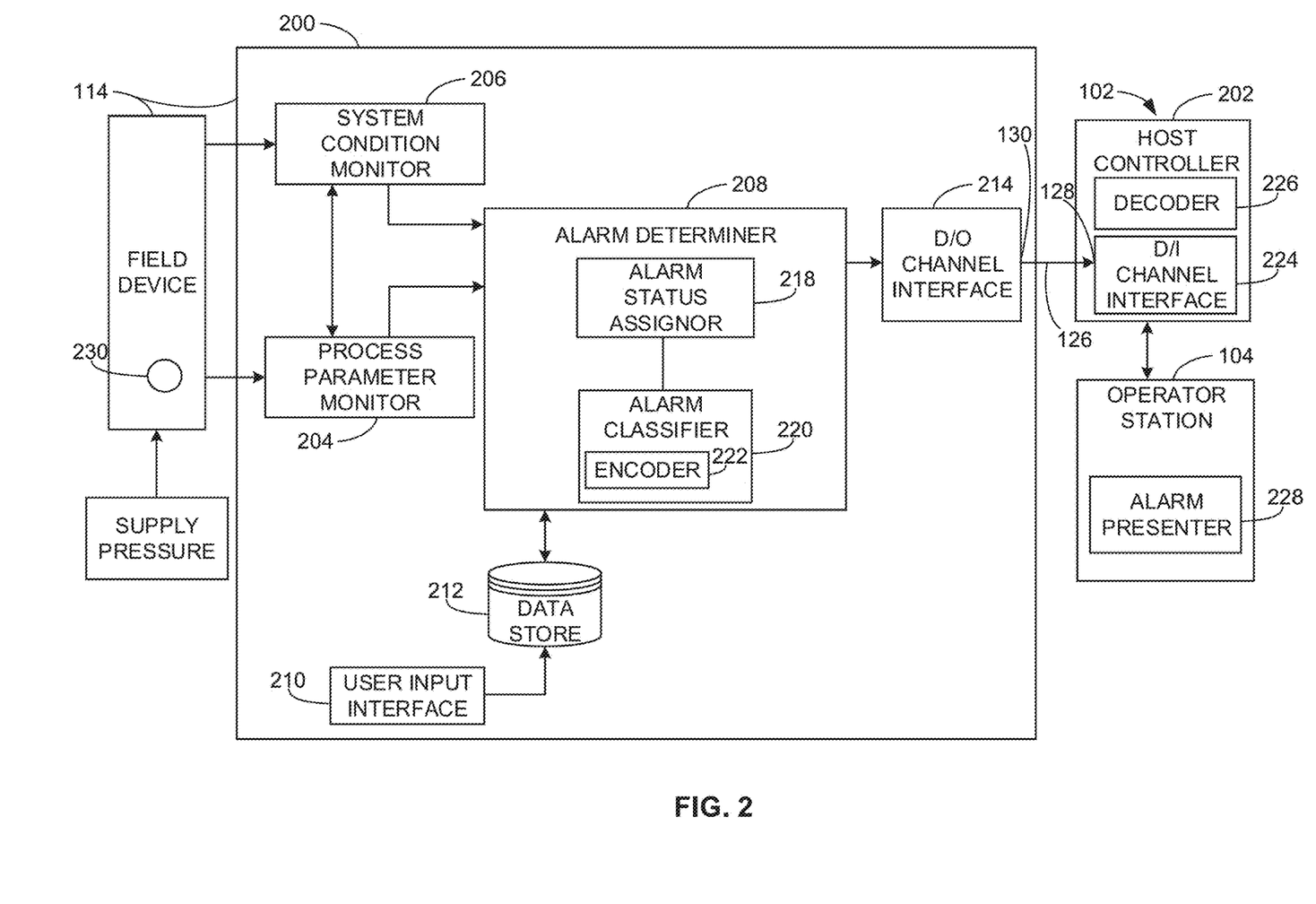
FIG. 2 is a block diagram of the example process control system of FIG. 1.

FIG. 2 is a block diagram of the field device 114 and the controller 102 of the example process control system of FIG. 1. More specifically, the block diagram of FIG. 2 includes a block diagram of an example field device controller 200 (e.g., of the example smart field device 114 of FIG. 1) and a block diagram of an example host controller 202 (e.g., the example controller 102 of FIG. 1). For example, the field device controller 200 may be a digital valve controller.

The field device controller 200 of the illustrated example includes a process parameter monitor 204, a system condition monitor 206, an alarm determiner 208, a user input interface 210, a data store 212, and a discrete output (D/O) channel interface 214. The alarm determiner of the illustrated example includes an alarm status assignor 218 and an alarm classifier 220. In the illustrated example, the alarm classifier 220 includes an encoder 222.

The host controller 202 of the illustrated example includes a discrete input (D/I) channel interface 224 and a decoder 226. In particular, the D/O channel interface 214 of the field device controller 200 (e.g., the discrete output channel 130) is coupled (e.g., directly coupled) to the D/I channel interface 224 of the host controller 202 (e.g., the direct input channel 128) via the dedicated communication interface 126 (e.g., a data cable). The host controller 202 is communicatively coupled to an alarm presenter 228 of the operator station 104.

The process monitor 204 of the illustrated example receives one or more process parameters from one or more field devices (e.g. sensors) of the example process control system 100 of FIG. 1. For example, the field device 114 of the illustrated example may include a control valve to control fluid flow of a process fluid of the process control system 100. The process parameters received by the process parameter monitor 204 of the illustrated example may include fluid velocity, fluid pressure, fluid temperature, operational position of the field device 114 (e.g., a close position, in open position), a supply pressure of a control fluid to an actuator of the field device, one or more output pressures of the control fluid to a first chamber of the actuator or a second chamber of the actuator of the field device 114, and/or any other process parameter(s). For example, the process parameter monitor 204 of the illustrated example may receive a temperature of a process fluid from a temperature sensor, a pressure of a process fluid upstream from the field device 114 via an upstream pressure sensor, a pressure of a process fluid downstream from the field device 114 via a downstream pressure sensor, and/or any other process parameter(s). The field device 114 and/or the process control system 100 may include one or more sensors to determine or detect the process parameter(s). For example, the field device 114 of the illustrated example includes a position sensor 230 (e.g., a travel sensor) to detect a position of a flow control member of the field device 114 relative to a valve seat, where the flow control member moves relative to the valve seat between an open position to allow fluid flow through the field device and a closed position to prevent or restrict fluid flow through the field device. The process parameter monitor 204 communicates the process parameter(s) to the alarm determiner 208.

The system condition monitor 206 of the illustrated example monitors a health status of the one or more field devices that measure, for example, one or more process parameter(s) noted above. In some examples, the system condition monitor 206 of the illustrated example provides a status notification for the equipment or field devices (e.g., the position sensor 230) associated with, for example, the process parameter(s) and/or equipment (e.g., processors, operating temperatures, etc.) of the field device controller 200. A condition of a field device may include an operational condition (e.g., a good status) or a non-operational condition (e.g., a bad status). In some examples, the system condition monitor 206 of the illustrated example may retrieve one or more process parameter(s) from the process parameter monitor 204 to determine a condition of a field device. In some examples, the system condition monitor 206 determines that a field device and/or equipment used to operate the field device is either in an operational condition (e.g., a working state) or a non-operational condition (e.g., a non-working state). The system condition monitor 206 of the illustrated example communicates status of the field devices (e.g., the field device 114) to the alarm determiner 208. Example status notifications may be triggered by failure notifications that include, but not limited to, flash ROM fail, reference voltage fail, drive current fail, temperature sensor fail, pressure sensor fail, travel sensor fail, processor fail alert, etc.

In some examples, the system condition monitor 206 of the illustrated example monitors an operational status or condition of the example position sensor 230 of the field device 114. When position sensor 230 is in an operational condition, for example, the position sensor 230 provides accurate information to the process parameter monitor 204 and/or the system condition monitor 206. When the position sensor 230 is in a non-operational condition, for example, the position sensor 230 provides inaccurate information to the process parameter monitor 204 and/or the system condition monitor 206 regarding a position of a flow control member of the field device 114. For example, if the field device 114 is instructed to move to a closed position, and the position sensor 230 detects or sends a signal to the process parameter monitor 204 and/or the system condition monitor 206 that the field device 114 is in an open position, the system condition monitor 206 detects if the position sensor 230 is in an operational condition or fail condition. In some examples, the system condition monitor 206 may measure or monitor a current or voltage of the equipment or field device (e.g., a sensor, a processor, etc.) to determine the operational state. In some examples, the position sensor 230 may output an error signal.

In some examples, the system condition monitor 206 of the illustrated example obtains process fluid flow information downstream from an outlet of the field device 114 (e.g., from a sensor positioned downstream from an outlet of the field device 114 and/or the process parameter monitor 204) to determine if the field device 114 is in an open position as indicated by the position sensor 230 or a closed position as indicated by a command from, for example, the host controller 202. If the system condition monitor 206 receives information indicative of no fluid flow downstream from an outlet of the field device 114, then the system condition monitor 206 determines that the position sensor 230 is in a non-operational state.

In some such examples, the system condition monitor 206 provide a status to the alarm determiner 208 that the position sensor 230 is in a faulty condition. If the system condition monitor 206 receives information indicative of fluid flow downstream from an outlet of the field device 114, then the system condition monitor 206 determines that the position sensor 230 is in an operational state. If the position sensor 230 is in an operation state, the system condition monitor 206 detects if a supply pressure 232 to an actuator of the field device 114 is insufficient to move the field device 114 to the closed position and/or may initiate an alarm that the valve is in a stuck position.

The alarm determiner 208 of the illustrated example detects or determines an error condition of the field device 114 and/or, more generally, the process system 100 of FIG. 1. An error condition is a condition associated with the field device 114 that initiates an alarm or notification to the operator station 104 and/or an operator regarding a parameter or process condition of the field device 114 that may affect the operation of the process control system 100 of FIG. 1. To determine an error condition (e.g., a condition that initiates an alarm) of the field device 114 (e.g., a sensor malfunction, a processor malfunction, etc.) and/or an error condition associated with a process parameter (e.g., deviation of a parameter (e.g., a pressure, a temperature, a flow velocity, etc.) from a threshold), the alarm determiner 208 receives the process parameter(s) from the process parameter monitor 204 and/or the status information from the system condition monitor 206.

To determine an alarm condition, the alarm determiner 208 of the illustrated example compares one or more process parameter(s) received from the process parameter monitor 204 to threshold process parameter(s) and/or receives one or more device operational condition(s) from the system condition monitor 206. For example, the alarm determiner 208 determines that an alarm condition exists when a process parameter (e.g., a supply pressure) is less than a threshold process parameter (e.g., a threshold supply pressure) retrieved from, for example, the data store 212. The threshold process parameter(s) and alert condition(s) to be monitored by the alarm determiner 208 may be user defined and/or can be provided to the data store 212 via the user input 210. Example parameter(s) and/or alarm settings that the alarm determiner 208 of the illustrated example may monitor can include for example, but not limited to, valve alerts, device failure alerts, process plant alerts, diagnostic alerts, miscellaneous alerts, and/or any other alert(s). For example, valve alerts may include travel low alert, a travel Hi alert, a travel deviation alert, an out of range drive signal alert, etc.

For example, the alarm determiner 208 of the illustrated example monitors set point positions (e.g., an upper set point position corresponding to a fully open position and a lower set point position corresponding to a closed position) of the flow control member of the field device 114 to determine if the flow control member of the example field device 114 moves beyond a threshold (e.g., 2%) of the target set points provided in the data store 212. In some examples, the field device 114 may be reset via a local control trip panel and the alarm determiner 208 monitors the condition of the field device 114 when the field device 114 is moved to a trip state.

In the illustrated example, if the alarm determiner 208 determines that an alarm condition exists, the alarm status assignor 218 of the illustrated example determines a status of the equipment associated with the detected alarm condition. More specifically, the example alarm status assignor 218 of the illustrated example provides a status notification of the alarm notification to improve quality or accuracy of the alarm notification determined by the alarm determiner 208. For example, the alarm status assignor 218 of the illustrated example may assign a good status if a component and/or equipment associated with the field device 114 is in an operational condition or a bad status if a component and/or equipment associated with the field device 114 is in a non-operational condition. Thus, the status notification may be analyzed by the host controller 202 and/or an operator to improve the accuracy of the detected error condition of the field device 114 detected by the alarm determiner 208.

For example, if a flow control member of the example field device 114 is commanded to move and the position sensor 230 provides a signal to the system condition monitor 206 that the flow control member of the field device 114 is stationary, the alarm status assignor 218 determines the operational status of the position sensor 230 before populating the D/I channel interface 224 with the alarm notification. For example, the alarm status assignor 218 of the illustrated example retrieves the operational status of the position sensor 230 from the system condition monitor 206 to determine if a positional indication of the flow control member of the field device 114 is accurately reflected based on the operational status of the position sensor 230. For example, if the alarm determiner 208 determines that the position of the flow control member of the field device 114 is indicative of an error condition, the status notification may be used to enable determination of an accuracy of the error condition detected by the alarm determiner 208. Thus, assigning a status to the alert notification may enable a user to determine the reliability of the alert notification. For example, if the status condition monitor 206 determines that the position sensor 230 is in a non-operational condition, the alarm status assignor 218 can assign a bad status to a determination by the alarm determiner 208 that the flow control member of the example field device 114 has exceeded a travel limit set point defined by the data store 212. Thus, a user at the alarm presenter 228 of the operator station 102 has information that the flow control member of the field device 114 may be in the correct position (e.g., a position based on a received command) and that the position sensor 230 is bad or non-operational. Thus, the alarm status assignor 218 of the illustrated example may assign a good status or a bad status to an alarm notification determined by the alarm determiner 208 and assigns such a status to the alarm notification prior to populating the alarm notification to the D/O channel interface 214.

The alarm determiner 208 of the illustrated example may monitor a plurality of conditions (e.g., over a hundred conditions) and provide an alarm status to the alarm presenter 228 for each of the conditions. Example process parameter(s), alert condition(s) and/or status notification(s) that can be monitored by the field device controller 200 of the illustrated example are provided in an instruction manual titled Fisher® FIELDVUE™ DVC 6200 Digital Valve Controller, published December 2013 by Emerson Process Management, which is hereby incorporated herein by reference in its entirety.

The alarm determiner 208 of the illustrated example provides an alarm notification and/or a status notification to the alarm presenter 228 of the operator station 104 via the D/O channel interface 214 of the field device controller 200 and the D/I channel interface 224 of the host controller 202. More specifically, an input channel of the host controller 202 is directly communicatively coupled (e.g., via a data cable) to an output channel of the field device controller 200 and receives the signal from the alarm determiner 208. In some such examples, the alarm determiner 208 communicates an alarm notification to the D/I channel interface 224 of the host controller 202 via the D/O channel interface 214. In some such examples, each alarm or alert to be presented to the alarm presenter 228 is assigned a dedicated discrete input channel of the D/I channel interface 224 of the host controller 202. Thus, each alarm or alert notification and status notification from the alarm determiner 208 is communicated to the host controller 202 via a dedicated discrete input channel of the D/I channel interface 224. Thus, if the D/I channel interface 224 has eight (8) discrete input channels, the host controller 202 may receive up to eight different alarm notifications and status notifications from the alarm determiner 208. The alarm or alert notifications to be provided by the alarm determiner 208 via the dedicated discrete input channels of the host controller 202 may be selected by a user via the user input interface 210 and stored in the data store 212.

For example, the alarm determiner 208 may provide the alert notifications and the status notifications via packet (e.g., a 2-bit data packet, a 2-bit binary value, etc.) and transmits the packet via the D/O channel interface 214 and the D/I channel interface 224. The host controller 202 of the illustrated example includes the decoder 226 (e.g., a function block) to decode the information or signal from the D/O channel interface 214 prior to processing or executing the information via, for example, a function block. In some such examples, each discrete input channel associated with the D/I channel interface 224 of the host controller 202 can receive an alarm notification and status notification associated with the field device 114 and/or the field device controller 200.

In some examples, the host controller 202 may process the alert notification and/or the status associated with the alert notification (e.g., via a function block) and command or control the operation of the field device 114 based on the received alert notification and/or the status notification associated with the alert notification. In some examples, the host controller 202, the application station 106 and/or the operator station 104 may control the operation of the field device 114 based on the alert notification provided by the alert determiner 208 to the host controller 202. In some examples, the process parameter monitor 204 and/or the alarm determiner 208 present statuses to the alarm presenter 228 of the operator station 104 during an operation of the field device 114. For example, during a partial stroke test of the field device 114, the alarm determiner 208 may present alert notifications and the status notification so that an operator can monitor the partial stroke test of the field device 114 via the alarm presenter 228 in real time (e.g., as the field device 114 is undergoing a partial stroke test).

As noted above, the number of alarm notifications and status notifications that can be presented to the host controller 202 via the D/I channel interface 224 may be limited by the number of discrete input channels of the D/I channel interface 224. To enable initiation of a number of alarms and/or status notifications that is greater than a number of discrete input channels of the host controller 202, the parameter(s), alarm settings and/or status notifications that the alarm determiner 208 may monitor can be classified into different groups or classifications. For example, the groups or classifications may include, for example a valve alert group, a device alert group, a diagnostic alert group, a miscellaneous alert group and/or any other group(s) or classification(s). In some examples, each group or classification of alarms, instead of the individual alarms in the respective group, may be associated with a discrete input channel of the D/I channel interface 224. For example, a first alarm group notification associated with a first group of alarms may be communicated to the host controller 202 via a first discrete input channel of the host controller 202 due to activation of one of a first plurality of alarms associated with the first group, and a second alarm group notification associated with a second group of alarms may be communicated to the host controller 202 via a second discrete input channel of the host controller 202 due to activation of one of a second plurality of alarms associated with the second group. For example, the D/I channel interface 224 of the illustrated example may include between one and eight discrete input channels, where each channel can support a dedicated alarm group or classification of alarms.

In some examples, the alarm determiner 208 may determine or select an alarm from a group of alarm classifications. For example, the alarm classifier 220 determines or selects which alarm is to be activated from a group of alarms. Such configuration enables a greater number of alarm notifications to be provided to the host controller 202 that can otherwise be received based on a number discrete input channels of the host controller 202. For example, a host controller having eight discrete input channels may be limited to monitoring eight alarm notifications. In examples where multiple alarms are to be associated with a respective one of the discrete input channels of the host controller 202, the alarm classifier 220 of the illustrated example identifies the alarm to be presented to the alarm presenter 228.

To enable a number of alarm identifications greater than a number of discrete input channels, the alarm classifier 220 may provide the alert notifications and the status notifications via packets (e.g., a 16-bit data packet, a 32-bit data packet) and transmits the packets via the D/O channel interface 214 and the D/I channel interface 224. In some examples, the encoder 222 may encode the alarm notifications and the status notification for transmission to the discrete input channel of the host controller 202. In some such examples, the host controller 202 of the illustrated example includes a decoder 226 that decodes the encoded alarm notification provided by the alarm classifier 220 and transmits or communicates the decoded alarm notification to, for example, a function block of the host controller 202 and/or the alarm presenter 228 of the operator station 104. Thus, in some examples, the alarm classifier 220 of the illustrated example enables a number of alarm notifications to be communicated to the host controller 202 that is greater than the number of discrete input channels of the D/I channel interface 224. In some such examples, the (e.g., the various) alarm notifications and the status notifications may be transmitted to the host controller 202 across a single discrete input channel.

While an example manner of implementing the field device controller 200 and/or the controller 202 (e.g., the host 122) of FIG. 1 is illustrated in FIG. 2, one or more of the elements, processes and/or devices illustrated in FIG. 2 may be combined, divided, re-arranged, omitted, eliminated and/or implemented in any other way. Further, the example process parameter monitor 204, the example system condition monitor 206, the example alarm determiner 208, the example user input interface 210, the example data store 212, the example D/O channel interface 214, the example alarm status assignor 218, the example alarm classifier 220, and the example encoder 222 and/or, more generally, the example field device controller 200 of FIG. 2 and/or the example D/I channel interface 224, the example decoder 226 and or, more generally, the host controller 202 of FIG. 2 may be implemented by hardware, software, firmware and/or any combination of hardware, software and/or firmware. Thus, for example, any of the example process parameter monitor 204, the example system condition monitor 206, the example alarm determiner 208, the example user input interface 210, the example data store 212, the example D/O channel interface 214, the example alarm status assignor 218, the example alarm classifier 220, and the example encoder 222 and/or, more generally, the example field device controller 200 of FIG. 2 and/or the example D/I channel interface 224, the example decoder 226 and or, more generally, the host controller 202 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example process parameter monitor 204, the example system condition monitor 206, the example alarm determiner 208, the example user input interface 210, the example data store 212, the example D/O channel interface 214, the example alarm status assignor 218, the example alarm classifier 220, the example encoder 222 the example D/I channel interface 224, and the example decoder 226 is/are hereby expressly defined to include a tangible computer readable storage device or storage disk such as a memory, a digital versatile disk (DVD), a compact disk (CD), a Blu-ray disk, etc. storing the software and/or firmware. Further still, the example field device controller 200 and/or the host controller 202 of FIG. 2 may include one or more elements, processes and/or devices in addition to, or instead of, those illustrated in FIG. 2, and/or may include more than one of any or all of the illustrated elements, processes and devices.

Figure 3:
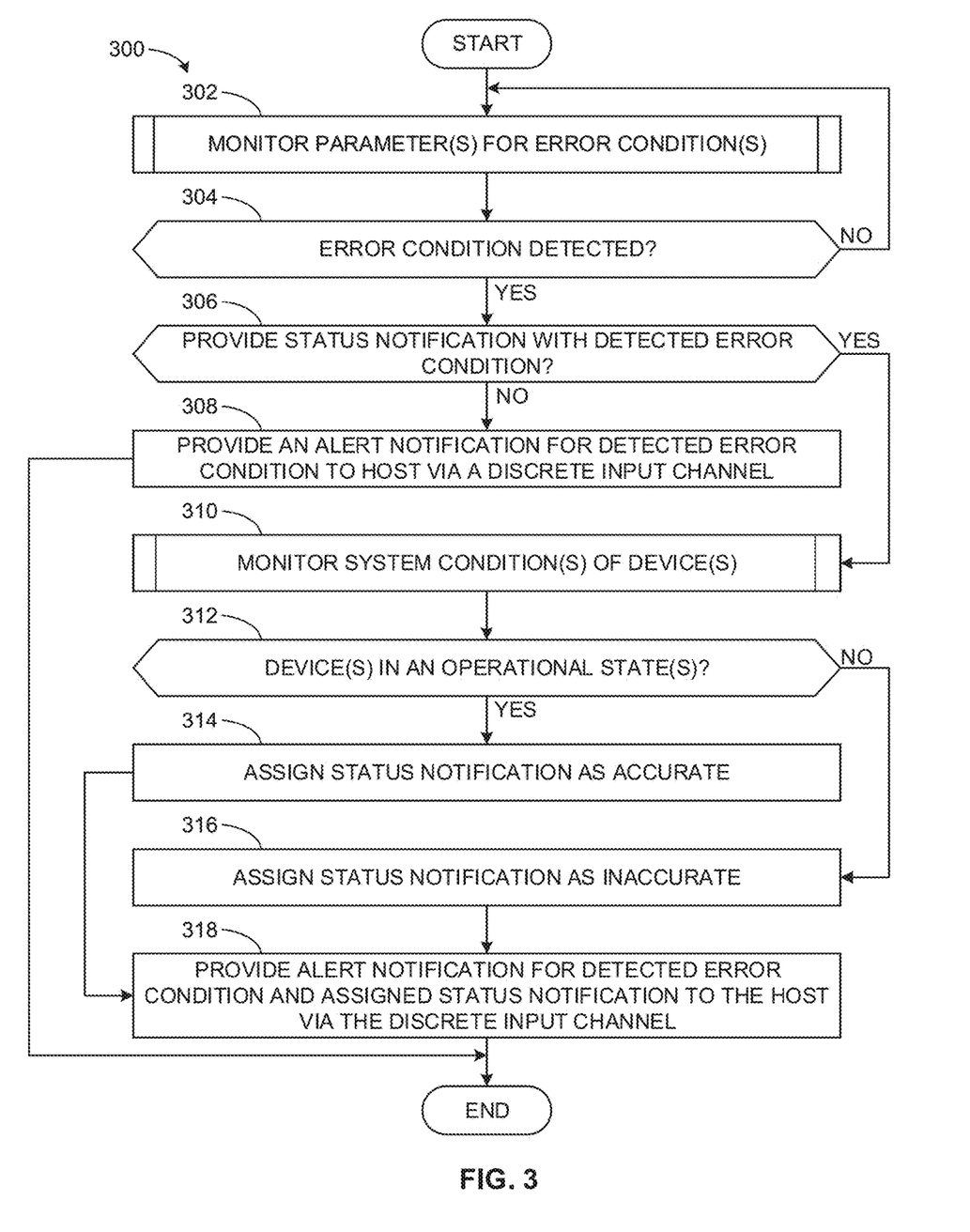
FIG. 3 is a flowchart representative of an example method that may be performed to implement the example process control system of FIGS. 1 and 2.
Figure 4:
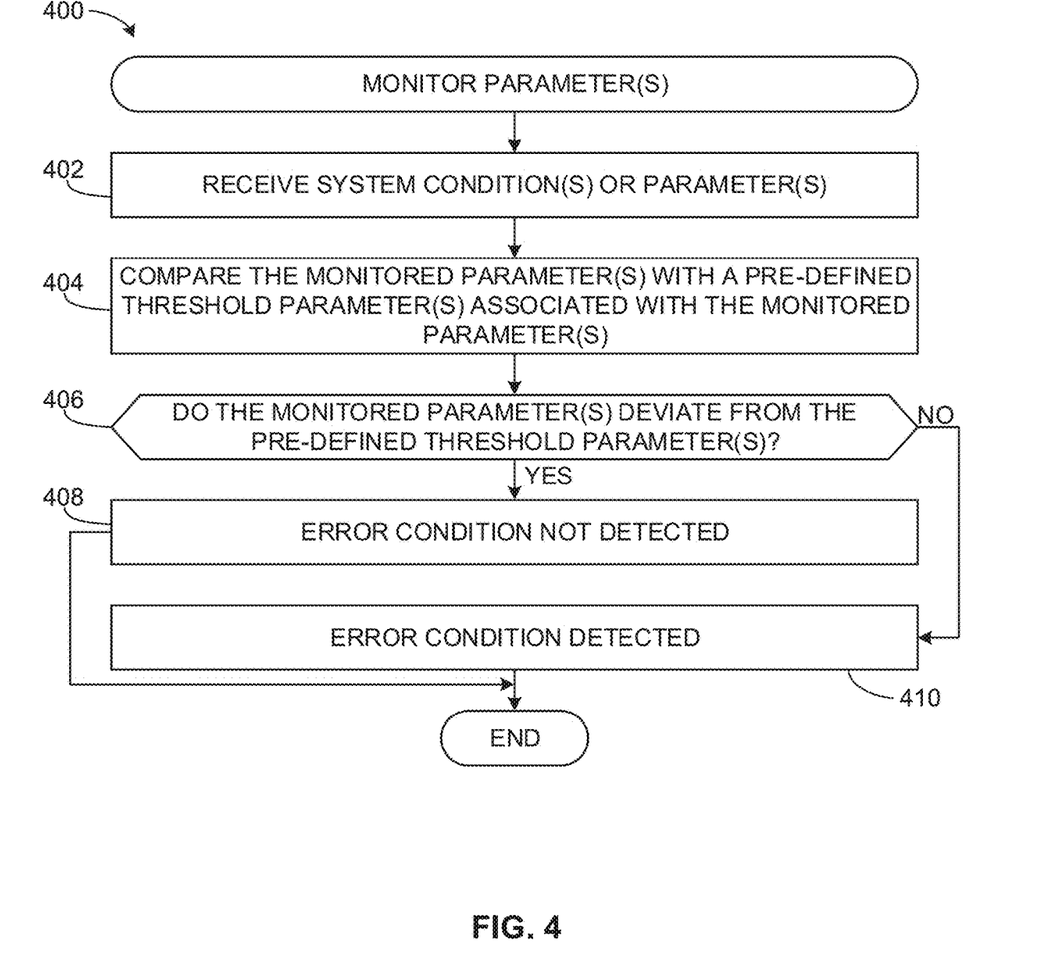
FIG. 4 is a flowchart representative of an example method that may be performed in the example method of FIG. 3 to determine an error condition.
Figure 5:
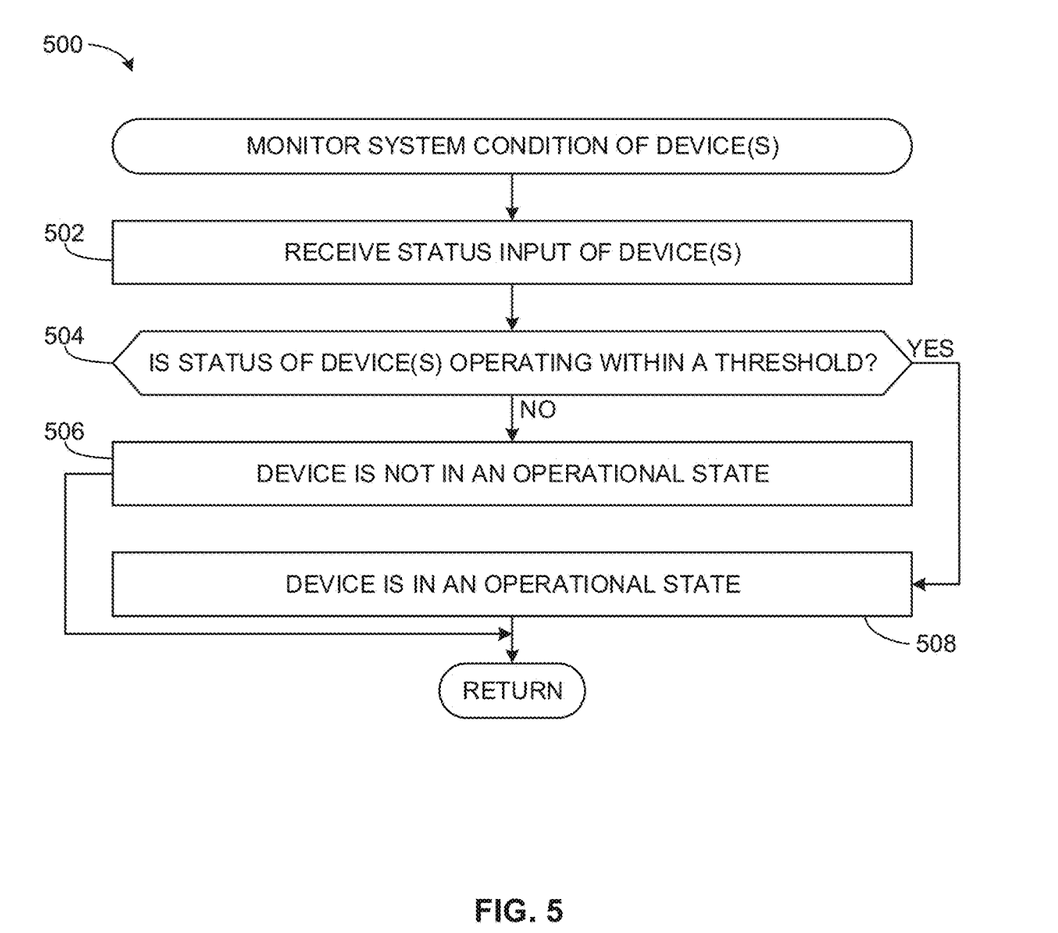
FIG. 5 is a flowchart representative of an example method that may be performed in the example method of FIG. 3 to monitor system condition(s) of device(s).

A flowchart representative of example methods for implementing the field device controller 200 and/or the host controller 202 of FIG. 2 is shown in FIGS. 3-5. In this example, the methods may be implemented using machine readable instructions that comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 3-5, many other methods of implementing the example field device controller 200 and/or the host controller 202 may alternatively be used. For example, the order of execution of the blocks may be changed, and/or some of the blocks described may be changed, eliminated, or combined.

As mentioned above, the example processes of FIGS. 3-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIGS. 3-5 are flowcharts representative of example methods 300-500 that may be performed to implement the example field device controller 200 and/or the host controller 202 of FIGS. 1 and 2. Referring to FIG. 3, the process parameter monitor 204 of the illustrated example monitors process parameters associated with the field device 114 (block 302) to detect an error condition (block 304). If an error condition is not detected at block 304, the process 300 returns to block 302. If an error condition is detected at block 304, the alarm determiner 208 and/or the alarm status assignor 218 determines if a status notification is to be provided for the detected error condition (block 306). If the alarm determiner 308 and/or the alarm status assignor 218 determine that a status notification is not needed at block 306, the alarm determiner 208 provides (e.g., generates or communicates) an alert notification for the detected error condition to the host controller 202 via the D/O channel interface 214 of the field device controller 200 and the D/I channel interface 224 of the host controller 202 (block 308).

If the alarm determiner 208 and/or the alarm status assignor 218 determines that a status notification for the detected error condition is to be provided at block 306, the system condition monitor 206 of the illustrated example monitors system condition(s) of device(s) (block 310). For example, the system condition monitor 206 monitors and/or determines an operational state of devices (e.g., equipment) associated with the detected error condition(s). In turn, the system condition monitor 206 of the illustrated example communicates the status or operational information to the alert determiner 208. In some examples, the alert determiner 208 of the illustrated example retrieves or obtains status information for equipment associated with the detected error condition(s) from the system condition monitor 206. In some examples, the alert determiner 208 and/or the alarm status assignor 218 determine the status of the device or equipment associated with the measured parameter that activated or caused a detected error condition(s).

If the alarm determiner 208 and/or the status condition monitor 206 determines that the device(s) (e.g., equipment associated with the detected error condition) is operational or functional (block 312), the alarm status assignor 218 of the illustrated example assigns a status notification as accurate or good (block 314). If the alarm determiner 208 and/or the status condition monitor 206 determines that the device(s) (e.g., equipment associated with the detected error condition) is not operational or functional (block 312), the alarm status assignor 218 of the illustrated example assigns a status notification as inaccurate or bad (block 316). The alert determiner 208 provides the alert notification for the detected error condition and the assigned status notification (e.g., from block 314 or block 316) to the host controller 202 via the discrete input channel 224 (block 318). For example, as noted above, the alert determiner 208 may configure the alert notification and the assigned status notification via the D/O channel interface 214 and the D/I channel interface 224. In some examples, the alarm determiner 208 configures the signals into packets (e.g., 2 bit packets) and communicates the packets to the host controller 202 over the same or single discrete input channel of the D/I channel interface 224. Thus, both the alert notification and the assigned status notification are communicated to the host controller 202 via the same discrete input channel of the D/I channel interface 224.

FIG. 4 is a flowchart representative of an example method 400 that may be used to perform block 302 of FIG. 3 to monitor parameter(s) for error condition(s). To monitor parameter(s) of the example field device 114 and/or, more generally, the process control system 100 and/or process parameter(s), the process parameter monitor 204 of the illustrated example receives system condition(s) or parameter(s) (block 402). For example, the process parameter monitor 204 of the illustrated example receives signals from one or more sensor(s) (e.g., pressure sensors, temperature sensors, flow sensors, etc.), voltage or current values from one or more of processor, sensor(s), memory, etc. For example, the process parameter monitor 204 monitors a position of a flow control member of the field device 114 via the position sensor 230, which provides positional information to the alarm determiner 208 representatives of a position of the flow control member between an upper limit travel set point and a lower limit travel set point.

The process parameter monitor 204 and/or the alarm determiner 208 of the illustrated example compares the monitored parameter(s), provided to the process parameter monitor 204, to predefined threshold parameter(s) provided via the data store 212 (block 404). For example, the process parameter monitor 204 and/or the alarm determiner 208 of the illustrated example compares a position signal representative of a position of the flow control member of the field device 114 that is provided by the position sensor 230 to a predefined upper threshold travel limit or a predefined lower threshold travel limit stored in the data store 212. If the monitored parameter(s) does not deviate from the predefined threshold parameter value (block 406), an error condition is not detected (block 408). If the monitored parameter(s) deviates from the predefined threshold parameter value (block 406), an error condition is detected (block 410).

FIG. 5 is a flowchart representative of an example method 500 that may be used to implement block 310 of FIG. 3 to monitor system condition(s) of device(s). The system condition monitor 206 monitors system condition(s) of the example field device 114 and/or, more generally, the process control system 100 and/or process parameter(s). To monitor the system condition(s), the system condition monitor 206 receives status inputs or information of device(s) associated with the field device 114 (block 502). The system condition monitor 206 determines an operational status of the devices such as, for example, sensors (e.g., the position sensor 230, temperature sensors, position sensors, pressure sensors, etc.), processors (e.g., a processor of the field device controller 200), and/or any other device or equipment that is used to provide process parameter(s) or information to the process parameter monitor 204.

Based on the received status inputs, the system condition monitor 206 and/or the alarm determiner 208 determine if the system equipment or device(s) is operating within a threshold (block 506). For example, if a device is within a threshold (e.g., an operating range) at block 506, the system condition monitor 206 and/or the alarm determiner 208 determines that the device is in an operational state (block 508). If a device is not within the threshold (e.g., an operating range) at block 506, the system condition monitor 206 and/or the alarm determiner 208 determines that the device is in a non-operational state (block 510). For example, if a current or voltage value of the position sensor 230 received by the system condition monitor 206 is within a current or voltage value threshold (e.g., an operating current or voltage range), the system condition monitor 206 and/or the alarm determiner 208 determines that the position sensor 230 is in an operational state.

Figure 6:
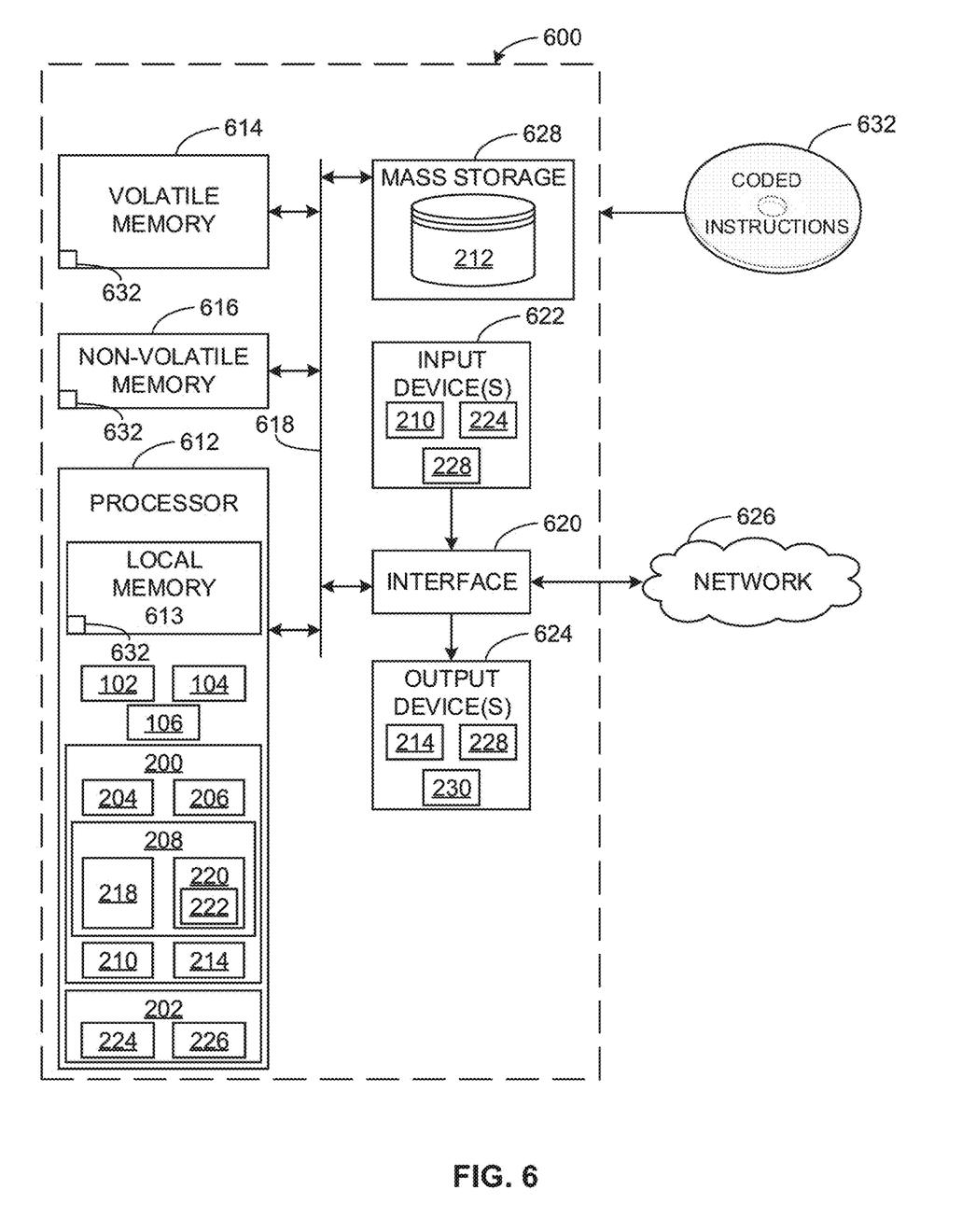
FIG. 6 is a schematic illustration of an example processor platform that may be used and/or programmed to carry out the example methods of FIGS. 3-5 and/or, more generally, to implement the example process control system of FIGS. 1 and 2.

FIG. 6 is a block diagram of an example processor platform 600 capable of executing instructions to implement the methods of FIGS. 3-5 and the field device controller 200 and/or the host controller 202 of FIG. 2. The processor platform 600 can be, for example, a server, a personal computer, a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 1012 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 to implement the methods of FIGS. 3-5 may be stored in the mass storage device 628, in the volatile memory 614, in the non-volatile memory 616, and/or on a removable tangible computer readable storage medium such as a CD or DVD.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

What is claimed is:

1. An apparatus comprising:
    a plurality of field devices, a first field device of the plurality of field devices to control a process of a process plant, the first field device having a digital valve controller with a discrete output channel, the digital valve controller to:
    monitor a process parameter of the field device;
    detect an error condition associated with the process parameter;
    generate an alarm notification associated with the error condition of the process parameter;
    assign a status notification for equipment associated with the process parameter detected to be in the error condition; and
    a host device communicatively coupled to the plurality of field devices via a communication bus, the host device to communicate with the plurality of field devices via a communication protocol over the communication bus, the host device having a discrete input channel directly coupled to the discrete output channel of the first field device to establish a dedicated communication line between the first field device and the host, the host to receive the alarm notification and the status notification from the digital valve controller of the first field device via the dedicated communication line separate from the communication bus, the host device to be communicatively coupled to a control room of a process plant.

2. The apparatus of claim 1, wherein the digital valve controller is to monitor a status of the equipment associated with the detected error condition.

3. The apparatus of claim 1, further including a user input interface to present selection of the error condition from a plurality of error conditions for communication via the discrete input channel.

4. The apparatus of claim 1, wherein the discrete input channel includes a plurality of discrete input channels and the error condition includes a plurality of error conditions, each of the discrete input channels being associated with a respective one of the error conditions.

5. The apparatus of claim 1, wherein the digital valve controller is to select the detected error condition from a plurality of error conditions.

6. The apparatus of claim 5, wherein the digital valve controller is to encode the detected error condition selected from the plurality of error conditions, the host device to receive the encoded error condition via the discrete input channel.

7. A method comprising:
    communicatively coupling a plurality of field devices and a host via a communication bus to enable transmission of information between the field devices and the host via a communication protocol over the communication bus;
    communicatively coupling a first field device of the plurality of field devices and the host via a dedicated communication line provided by a discrete output channel of the first field device and a discrete input channel of the host;
    detecting an error condition associated with the first field device of a process control system;

monitoring a status of equipment associated with the error condition;

assigning a status notification based on an operational status of the monitored equipment; and communicating the detected error condition and the status notification via the dedicated communication channel instead of the communication bus.

8. The method of claim 7, further including presenting for selection, via an input interface, the error condition from a plurality of error conditions to be communicated to the host via the discrete input channel.

9. The method of claim 7, wherein monitoring the status of the equipment associated with the error condition includes determining if the equipment is operating within a threshold.

10. The method of claim 7, further including assigning a first bit to the detected error condition and assigning a second bit to the status notification, communicating the first bit and the second bit to the host via the discrete input channel.

11. The method of claim 7, further including selecting the detected error condition from a plurality of error conditions.

12. The method of claim 11, further including encoding the selected error condition and communicating the encoded error condition to the host via the discrete input channel.

13. The method as defined in claim 7, further including improving an accuracy of the detected error condition based on the status notification.

14. A tangible article of manufacture storing machine readable instructions which, when executed, cause a machine to:

communicate information between a plurality of field devices and a host of a process control system via a communication protocol provided over a communication bus communicatively coupling the host and the field devices;

detect an error condition associated with a first field device of the plurality of field devices;

monitor a status of equipment associated with the error condition;

assign a status notification based on an operational status of the monitored equipment; and communicate the detected error condition and the status notification via a dedicated communication line via a discrete output channel of the first field device to a discrete input channel of the host, the dedicated communication line being separate from the communication bus.

15. The tangible article of manufacture as defined in claim 14, wherein the machine readable instructions, when executed, further cause the machine to present for selection the error condition from a plurality of error conditions to be communicated to a host via the discrete input channel.

16. The tangible article of manufacture as defined in claim 14, wherein the machine readable instructions, when executed, further cause the machine to monitor a status of equipment associated with the error condition.

17. The tangible article of manufacture as defined in claim 16, wherein the machine readable instructions, when executed, further cause the machine to determine if the equipment is operating within a threshold when monitoring the status of the equipment associated with the error condition.

18. The tangible article of manufacture as defined in claim 14, wherein the machine readable instructions, when executed, further cause the machine to select the error condition from a database of a plurality of error conditions.

19. The tangible article of manufacture as defined in claim 18, wherein the machine readable instructions, when executed, further cause the machine to encode the selected error condition and the status notification and communicate the encoded error condition and the status notification to the host via the discrete input channel.

20. The tangible article of manufacture as defined in claim 14, wherein the machine readable instructions, when executed, further cause the machine to determine an accuracy of the detected error condition based on the status notification.

21. The apparatus of claim 1, wherein the alarm notification and the status notification from the digital valve controller via the dedicated communication line bypasses the communication protocol provided over the communication bus.

22. The apparatus of claim 1, wherein the dedicated communication line enables unsolicited communication between the field device and the host.

* * * * *